US005624690A

United States Patent [19]

Boldis et al.

[11] Patent Number: 5,624,690

[45] Date of Patent: Apr. 29, 1997

[54] CONTROLLED RELEASE OF METERED QUANTITIES OF FINELY DIVIDED SOLIDS WITH A VENTURI NOZZLE AND REGULATED CONTROL

[75] Inventors: Josef Boldis, Biberach; Volker I. Glasel, Biberach; Ekkehard Flaischlen, Ingoldingen; Gunther M. Voss, Diessen, all of Germany

[73] Assignee: Dr. Karl Thomae GmbH, Biberach an der Riss, Germany

[21] Appl. No.: 457,339

[22] Filed: Jun. 1, 1995

Related U.S. Application Data

[60] Continuation of Ser. No. 290,270, Aug. 15, 1994, abandoned, which is a division of Ser. No. 65,974, May 21, 1993, Pat. No. 5,356,577, which is a continuation of Ser. No. 792,821, Nov. 15, 1991, abandoned, which is a continuation of Ser. No. 331,927, Mar. 31, 1989, abandoned.

[30] Foreign Application Priority Data

Apr. 2, 1988 [DE] Germany .......................... 38 11 260.4

[51] Int. Cl.$^6$ .......................... B29C 43/00

[52] U.S. Cl. .......................... 425/100; 425/103; 425/166; 426/811

[58] Field of Search .......................... 264/39; 425/100, 425/103, 107, 145, 166, 256, DIG. 115; 426/811

[56] References Cited

U.S. PATENT DOCUMENTS

| | | | |
|---|---|---|---|
| 3,525,382 | 8/1970 | Devol | 425/100 |
| 3,558,052 | 1/1971 | Dunn . | |
| 4,047,866 | 9/1977 | Shah | 425/107 |
| 4,388,343 | 6/1983 | Voss et al. | 425/107 |
| 4,707,309 | 11/1987 | Voss et al. | 425/107 |
| 5,017,122 | 5/1991 | Staniforth | 425/100 |

FOREIGN PATENT DOCUMENTS

| | | |
|---|---|---|
| 48-20103 | 6/1973 | Japan . |

*Primary Examiner*—C. Scott Bushey
*Attorney, Agent, or Firm*—R. P. Raymond; M-E. M. Devlin; A. R. Stempel

[57] ABSTRACT

The invention relates to a process and apparatus for the controlled release of metered quantities of finely divided solids with one or more regulated venturi nozzles for the purpose of applying lubricant or separating compound to the stressed surfaces of pressing tools in tablet making machines or for applying finely divided solids to solid carrier materials particularly in the fields of pharmaceuticals, foodstuffs or catalysts.

7 Claims, 2 Drawing Sheets

CONTROLLED RELEASE OF METERED QUANTITIES OF FINELY DIVIDED SOLIDS WITH A VENTURI NOZZLE AND REGULATED CONTROL

This is a continuation, of application Ser. No. 08/290, 270, filed Aug. 15, 1994(abandoned), which is a division of application Ser. No. 08/065,974, filed May 21, 1993, now U.S. Pat. No. 5,356,577 which is a continuation of application Ser. No. 07/792,821, filed Nov. 15, 1991(abandoned), which is a continuation of application Ser. No. 07/331,927, filed Mar. 31, 1989(abandoned).

BACKGROUND OF THE INVENTION

1. Field of the Invention

The invention relates to a process and apparatus for the controlled release of metered quantities of finely divided solids with one or more venturi nozzles with regulated control for the purpose of applying lubricant or separating compounds to the stressed surfaces of pressing tolls in tablet making machines or for applying finely divided solids to solid carrier materials, particularly in the pharmaceutical, food or catalyst fields.

The aim of the invention is to release powdered or finely divided solids in controlled manner and in metered individual amounts, i.e., in the form of bundles of powder of a defined size, in fixed cycles onto carriers which are traveling past. The carriers might be, for example, in the food industry, baking molds or chocolates which are to be coated with a powdered material; in the pharmaceutical and catalyst field, tablets might be provided with separating coatings in this way; however, this process is particularly interesting for applying powdered lubricants to the mechanically stressed surfaces of pressing tools for making tablets out of granules if this lubricant has to be applied in controlled manner to specific zones of the pressing tools but also in specified quantities.

2. Description of the Prior Art

U.S. Pat. No. 4,323,530 describes a method of compressing granules to form tablets, cores for coated tablets and the like in which, before each pressing operation, a specific amount of lubricant in liquid or suspended form is applied to the stressed zones of the pressing tools using an intermittently operating nozzle system. This method of lubrication means that no lubricant such as magnesium stearate has to be added to the granules which are to be compressed; this results, for example, in drugs which have substantially improved bio-availability of the active substance contained therein. Since a lubricant, such as magnesium stearate, which is difficultly soluble in a solvent such as water or lower alcohol can only be applied to the pressing zones in the desired or necessary quantity if larger amounts of these solutions are sprayed or dotted onto the surfaces, the need has arisen for lubricants of this kind to be capable of being applied to the zones in question in powder form.

In this connection, a process was known (DE-A-2 456 298) for coating moulds for blanks by means of an air/lubricant mixture in which the lubricant was in the form of a dry powder so that it could be electrically charged so as to be deposited electrostatically in this state on the inner walls of a mould, using an injection device. The implementation of a process of this kind makes very stringent demands on the production of a suitable press. The electrostatic deposition also results in a high degree of contamination of the area surrounding the pressing tools as a result of unavoidable static charging both of the components and of the dust from the granules. This type of coating with lubricants has not caught on in the art of tablet manufacture for these and other reasons and differs fundamentally from a controlled application of lubricants to specific zones of the pressing tools and also to specific zones of carrier materials such as are conventionally used in pharmaceuticals, foods or catalysts.

U.S. Pat. No. 3,461,195 describes an apparatus for lubricating matrices using powdered lubricants. By means of a valve, compressed air is forced into a tank filled with the powdered lubricant and the mixture of powder and air is blown into a lubrication chamber on the tablet-making shoe. This apparatus is designed only for slowly operating eccentric presses and cannot be transferred to modern rotary presses.

Japanese Patent No. 20 103 73 describes the coating of the surfaces of pressing tools in tablet making machines with a mixture of powder and air. A cone of powder/air mixture is released at exit openings directed onto the pressing tools and the distribution of the mixture over the upper and lower punches is adjusted by means of a throttle valve. A strong current of air is needed to prevent blockages in the intake system and in the valve. Any clouds of the lubricant/air mixture in the region of the punches and dies which could result in contamination not only of the pressing tools and their sliding bearings but also of the tablet-making plate, are overcome by the provision of baffle plates and a suction device. The use of a cone of powder/air mixture for applying powdered lubricants to the pressing tools therefore requires extensive protective measures which are also difficult to carry out in the restricted space available between the lower and upper punches in a tablet making machine. Nevertheless, soiling of the tablet making machine in the long-term as a result of atomisation of the lubricant powder is unavoidable. According to the process of this Japanese patent, first of all a mixture of lubricant powder and air is produced, which is then passed to the exit openings, under the control of a valve, in order to be released there in the form of a spray cone; there is no discussion of any controlled and quantified application of the mixture of lubricant and air.

SUMMARY OF THE INVENTION

A method has now been found of applying powdered solids, e.g., lubricants, to specific zones of surfaces in controlled manner, which does not have the disadvantages detailed above. The invention consists of a process for the controlled release of metered quantities of finely divided solids for the purpose of controlled application of lubricants or separating compounds, for example, to the stressed surfaces of pressing tools in tablet making machines or solids on solid support materials, e.g., in the pharmaceutical, food or catalyst field. More precisely, the process according to the invention consists in first homogenizing the powdered solid which is to be applied and then sucking it in through a gaseous transporting medium by means of one or more venturi nozzles and transporting it in controlled manner and in metered amounts to the desired object moving past, the transporting medium operating in a set cycle, through one or more valves, synchronously with the timing of the objects traveling past.

However, the invention also relates to apparatus for carrying out the process. The substance which is to be applied is sucked in through a gaseous transporting medium with the aid of one or more venturi nozzles and is released through the openings of these nozzles in a controlled and quantified manner onto the object which is to be treated, the transporting medium passing through a valve in a set cycle synchronously with the timing of the objects travelling past; the venturi nozzle and the regulated control enable the substances which are to be applied to be released in controlled and quantified manner.

The gaseous transporting medium may be compressed air or another gas such as nitrogen. The transporting medium is controlled by one or more valves which are actuated electronically, mechanically or pneumatically. The actuation of the valve or valves depends on the frequency and speed at which the objects to be treated travel past the exit openings of the venturi nozzle or nozzles. In tablet making machines, sensors, for example, indicate when the pressing tools which are to be treated have arrived at a control device which briefly opens the valve or valves for the transporting medium at the correct instant, whilst the transporting medium now flowing through the venturi nozzle sucks in a defined quantity of the powder/gas mixture which contains the substance to be applied, e.g. lubricant, and accelerates it in order to apply this quantified mixture to the surfaces in question in controlled manner. The controlled application of the mixture is achieved by synchronising the pulses and by the geometry of the nozzle openings, which may be slot-shaped or oval or may also be in the form of a figure of eight.

For certain purposes it is advantageous to use as the valve a rotary slide valve which abuts on the entry of the venturi nozzle and interacts functionally therewith. The rotary slide which abuts on a spindle and is actuated in regulated manner thereby, serves as a compressed air valve for the venturi nozzle or nozzles which is or are arranged in a stationary manner directly behind the rotary slide. The vacuum produced by the venturi nozzle sucks in the mixture of powder and gas, e.g. powder and air, whilst the jet of transporting medium, e.g. a jet of air, from the venturi nozzle simultaneously accelerates the mixture towards an outlet opening and thence towards the surfaces which are to be treated.

The venturi nozzle is arranged directly in front of the surface which is to be treated, e.g. a pharmaceutical preparation, a punch and a die in a tablet-making machine. In order to obtain particularly tight bunching or uniform speed distribution of the jet leaving the venturi nozzle, to avoid having particles of medium straying before they reach the zones which are to be treated, it is advisable to provide a calming or stabilising zone or stabilising tube behind the venturi nozzle. If desired, a deflecting device may also be provided in this stabilising tube, which deflects the pulsed jet produced towards the objects to be treated.

The objects will be coated or treated with dots or lines of the substance if the outlet opening is in the form of a hole.

The substance will be applied in a rectangular or square pattern to the corresponding surfaces of the object travelling past if the outlet opening is in the form of a slot, which may be more or less elongate.

If a rotary slide valve is used, other types of application including different applications in different directions, can be achieved if a drum acting as a template is secured on the inner shaft of the rotary slide valve in front of the outlet, slot, optionally at the end of the stabilising tube, this drum rotating synchronously with the rotary slide. Thus, for example, the upper and lower punches of a tablet-making machine may be treated in different ways or various patterns such as circles, stars, letters of the alphabet may be applied to substrates such as chocolates. It is most advantageous to provide a template immediately before the outlet opening or openings of the stabilising zone in order to modify the pulsed jet released. Obviously, it is also possible to modify the jet using other types of valve if the template is synchronised with the frequency of the punches.

In general, the compressed air for the venturi nozzle is supplied through a micrometering valve as a function of the frequency and speed at which the objects are travelling past the nozzle opening, e.g. the tablet press. In the case of the rotary slide valve, the rotary slide takes over this function; for this purpose, the number of revolutions of the spindle on which the rotary slide is mounted is coupled to the frequency and speed at which the objects travel past the nozzle opening.

Preparation of the finely divided solid to produce a homogeneous powder/gas mixture is carried out in a homogenisation chamber situated in front of the venturi nozzle. The preparation and homogeneous distribution of the powder particles in the gas are achieved by means of a stirrer and/or a fluidised bed, with the powder/gas mixture which is to be transported passing through a screen before it is sucked into the venturi nozzle, any large particles being rubbed through this screen by the action of a spreader. A metering device situated upstream of the homogenising station is coupled proportionally with respect to the fixed cycle of the valve or valves, for the preliminary metering of the solids which are to be finely divided, whilst the transmission ratio, i.e. the ratio of the throughput of the metering device to the cycle of the valve, which has to be adapted to the type of powdered material in question, can be selected freely and adjusted individually.

In one embodiment for treating the pressing tools of tablet making machines with a mixture of lubricant powder and air, the solid lubricant, e.g. magnesium stearate, is supplied through a funnel to a metering screw. A stirring mechanism optionally provided in front of the metering screw breaks up the lubricant until it can be transported through the metering screw. The metering screw is driven by a motor the revolutions of which are dependent on the speed of the tablet press and the desired metered quantity. The metering screw, which also performs an axial movement, transports the lubricant into a homogenisation chamber, e.g. a fluidisation chamber. The fluidised bed is produced by compressed air supplied at the base of the fluidisation chamber. The quantity of air for producing the fluidised bed is adjustable. A stirrer driven by a motor in the fluidisation chamber prevents lumps from forming. Between the fluidisation chamber and the intake line at the venturi nozzle, there is a screen with a spreader which the material must pass through before being sucked in. The mixture of lubricant powder and air is sucked in and accelerated by the vacuum produced by the air pulse of the venturi nozzle after actuation of the valve and is then expelled through the exit opening of the venturi nozzle as a smaller or larger jet of powder, depending on the length of the air pulse, onto the object which is to be treated, in this case specific zones of the punch and dies. If a metering apparatus of this kind is used, it is possible to produce up to 200,000 pressings in one hour, whilst the quantities of solids required to lubricate the pressing tools may fluctuate, in general, between 0.01 and 2 mg per tablet (depending on the size of the tablet and the nature of the lubricant).

In another embodiment, the preliminary metering is effected by means of a metering device (e.g. micro-metering device made by Gericke), which always releases a specific quantity of the lubricant powder, by means of a stirrer blade, onto a rotor provided with one or more grooves. A wiper engaging in these grooves ensures that the powder is released into a homogenisation chamber; the metered quantity may be selected precisely within wide limits from 13 to 9600 ml/hour, for example.

In the homogenisation chamber is a stirrer, e.g. in the form of blades wound about a spindle. The chamber which serves to prepare the lubricant powder is bounded by a screen at its outlet portion, on which a spreader rotates to break up any large lumps; this spreader may be fixed to the spindle which carries the stirrer blades in the chamber, but it may also be synchronised with the frequency of the venturi nozzle. Whilst the stirrer in the chamber prevents solids from settling and lumps from forming, the spreader rubs the solids through the screen and thus meters the powder into the adjacent chamber and prevents the powder from caking on the screen surface. The vacuum generated by the venturi nozzle sucks the spread solids out of the chamber adjoining the underside of the screen, whilst the jet of air from the venturi nozzle accelerates the mixture of solids and air towards the outlet openings. The bundles of powder produced by the cyclic action of the jet of air reach the surfaces of the pressing tools which are to be coated.

In another embodiment, the powder is first metered as described above and conveyed in this form to a homogenisation chamber in order to produce a powder/gas mixture. In the homogenisation chamber, a stirrer, e.g. in the form of inclined blades, which may also take the form of a helical stirrer, is secured on an external shaft, the spindle of this stirrer being driven by a motor with an infinitely variable speed. Whereas the external shaft ends at the stirrer, an internal shaft mounted therein extends up to the venturi nozzle, which in this case is coupled directly to a rotary slide valve; the shaft abuts on the actual rotary slide element of this valve. This shaft is driven by a motor with tachogenerator and PID regulation (PID=Proportional-Integral-Differential) and is thus synchronised with the speed of the tablet making machine. The stirrer prevents any solids from settling and any lumps from forming in the homogenisation chamber. A screen separates the homogenisation chamber from the inlet into the venturi nozzle. A spreader mounted on the internal shaft rubs the solids through the screen and also prevents the powder from caking on the surface of the screen. The combination of stirrer and spreader has the task of equalising any fluctuations in the preliminary metering and achieving a homogeneous mixture of lubricant powder and air. The rotary slide fixed on the internal shaft behind the screen acts as a compressed air valve for the venturi nozzle, which is mounted directly behind the rotary slide. The vacuum produced by the venturi nozzle sucks in the spread mixture of powder and gas, and the jet of air from the venturi nozzle accelerates the powder/gas mixture towards the outlet openings and onto the surfaces which are to be coated. Using this apparatus it is possible to produce up to 200,000 tablets per hour without having to add any lubricant to the granules. Only 0.01 to 2 mg of lubricant are required per tablet; the quantity depends on the size of the tablet and the type of lubricant.

The invention also relates to the apparatus for controlled release of metered quantities of finely divided solids.

DETAILED DESCRIPTION OF THE INVENTION

Figure 1:
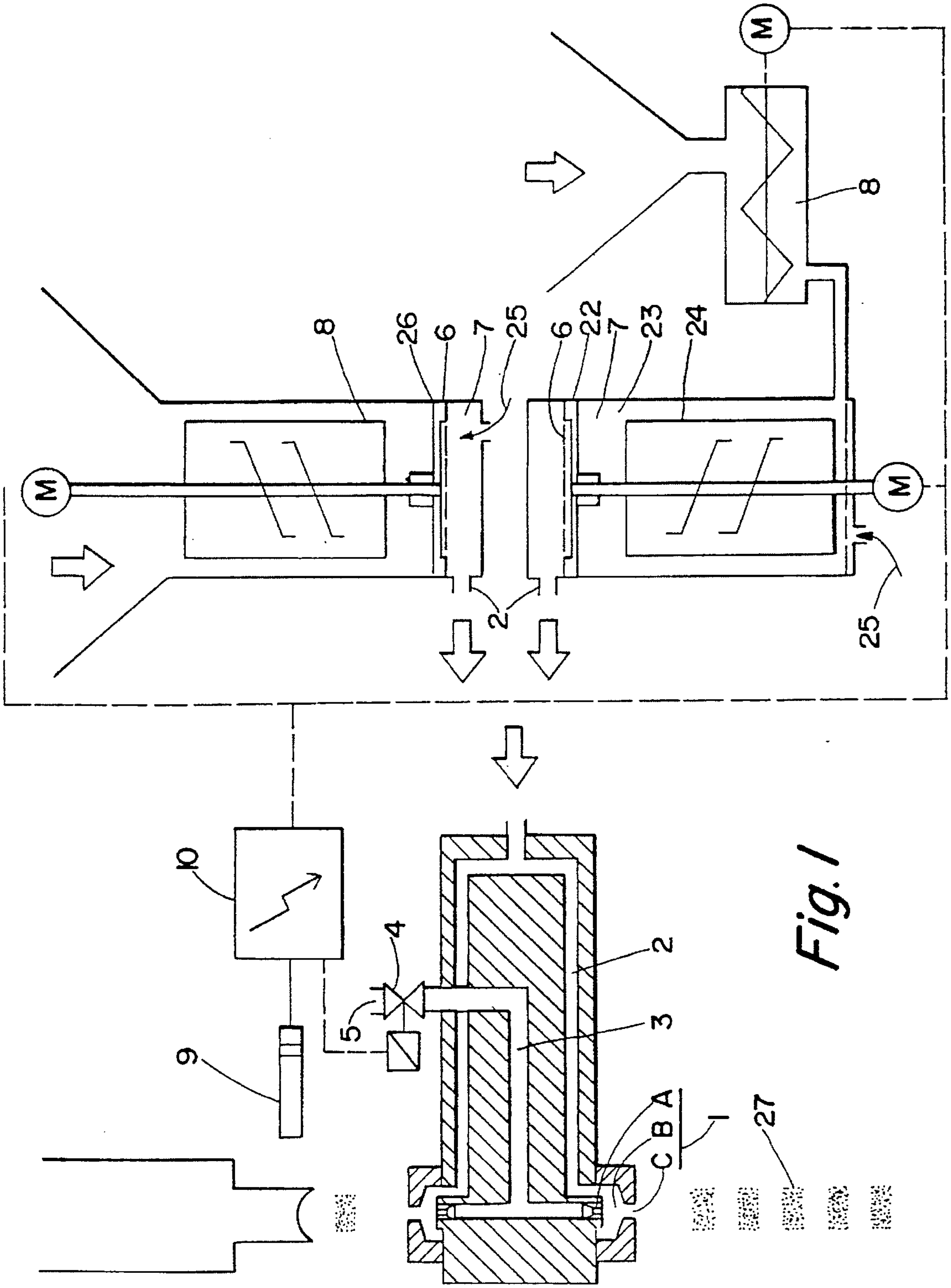
FIG. 1 shows a cross-sectional view of an apparatus according to the present invention.
Figure 2:
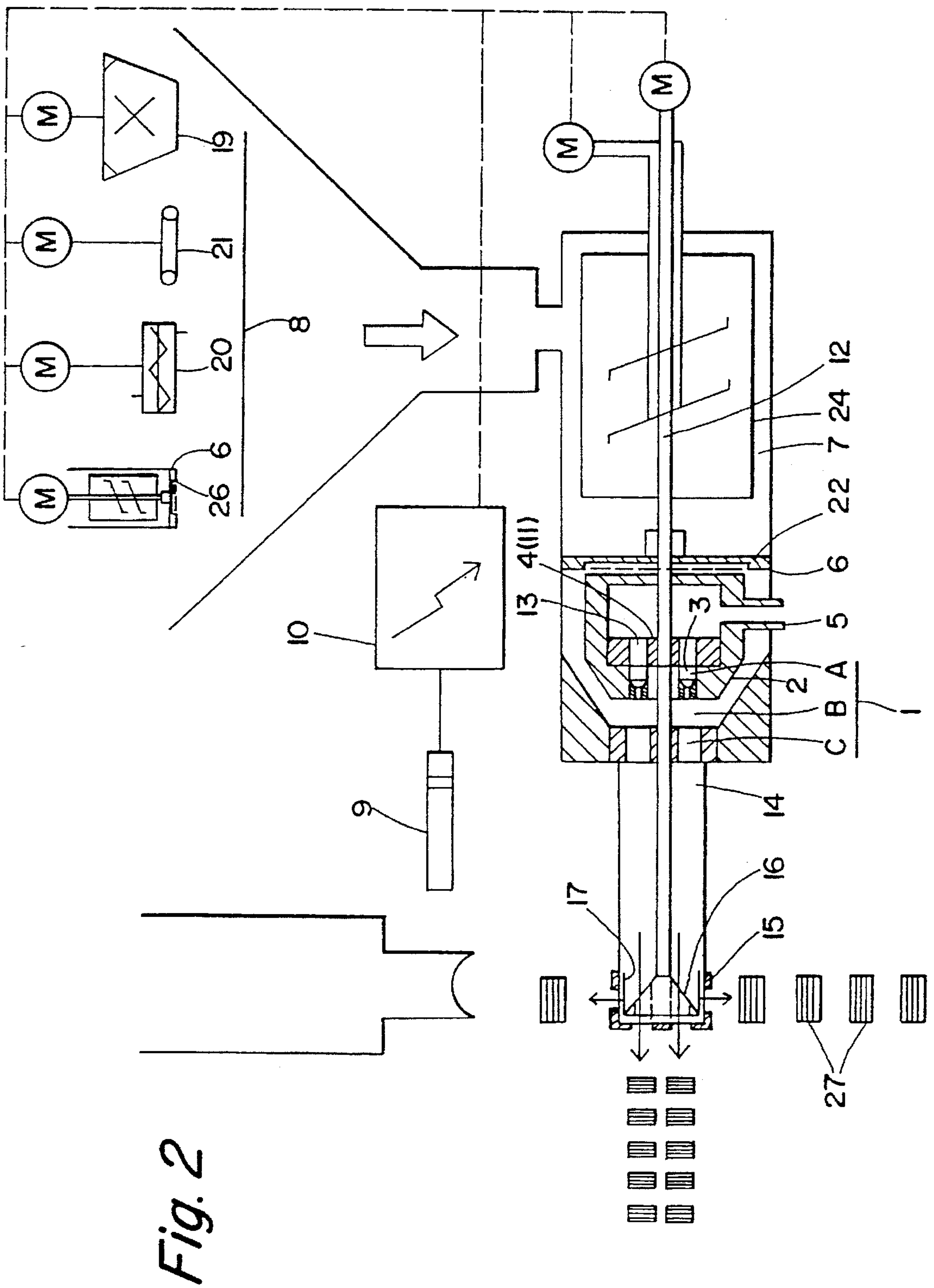
FIG. 2 shows a cross-sectional view of an apparatus according to the present invention.

FIGS. 1 and 2 show a venturi nozzle (1) consisting of one or more air nozzles A in conjunction with one or more mixing chambers B and one or more mixing nozzles C, one or more intake channels (2) adjoining the venturi jets and connected to a homogenization chamber (7) and a screen (6), a propellant duct (3) which connects a valve (4) to a venturi nozzle (1), a pressure gas connection (5); in one embodiment, a screen (6) may be provided between the intake channel (2) and a homogenization chamber (7) connected to a metering device (8), whilst the latter may also be mounted directly in or in front of the homogenization chamber, a sensor (9) being provided for generating signals in conjunction with a control device (10) which actuates the valve (4) and controls the regulated values of the metering device (8). The metered material leaves the mixing nozzle C as a mixture of powder and air in the form of bundles (27) of powder.

In FIG. 2, the venturi nozzle (1), which in turn consists of one or more air nozzles A, one or more mixing chambers B and one or more mixing nozzles C, has at its entry end a rotary slide valve (11) secured to a spindle (12), the spindle (12) being driven by a motor M synchronously as a function of the number of nozzle openings (13) at the required speed; in an advantageous embodiment, a stabilising tube (14) fits flush against the mixing nozzle or nozzles C and at its end the metered material emerges through a slot-shaped opening (15) as a powder/air mixture in the form of bundles of powder (27). The opening (15) may be situated around an extension of the spindle (12), but a deflector device (16) may also be mounted on the spindle (12), or on its own spindle provided on an extension of the spindle (12), or else fixedly on the end of the stabilising tube (14), said deflector device deflecting the metered material at right angles. In addition, a template (17) may be mounted in front of the outlet opening, to ensure that the material is applied, in a geometrically modified pattern, on the zones which are to be treated.

In the embodiment shown in FIG. 2, the outlet opening C of the venturi nozzle may be in the form of a diaphragm piston which is axially movable back and forth by virtue of its intrinsic elasticity. By moving at regular intervals of time it prevents harmful deposits of the transported material from accumulating in the region of the outlet opening of the venturi nozzle.

In the embodiment according to FIG. 2, brush or wiper elements may be provided on the spindle (12) in the region B of the venturi nozzle, offset relative to the rotary slide bores (13) and, similarly, in the region of the stabilising tube (14), these brush or wiper elements preventing any accumulation of the material which is to be transported in these areas. The homogenisation chamber (7) is supplied with the powdered material either by means of a feed roller (19) as part of a micro-metering device (e.g. the apparatus made by Messrs. Gericke) or a single-or double-shaft metering screw (20) or a conveyor belt (21) or a spreader (26), which with screen (6) serve as metering devices. The regulated quantity provided by these metering devices is controlled in accordance with the cycle of the nozzle or nozzles so that the quantity of powder to be introduced into the homogenisation chamber (7) is a selectable ratio with respect to the number of strokes.

The homogenisation chamber (7) may also be constructed as a fluidised bed chamber (23) and/or it may have a stirring mechanism (24) suitable for homogenisation; however, the material may also be homogenised by a suitable supply of air (25), either directly or in an auxiliary manner.

In some of the embodiments described, it is advisable to provide the screen (6), on its side facing the homogenisation chamber (7), with a resiliently mounted spreader (22) which, in the embodiment shown in FIG. 2, is fixed on the rotary slide shaft (12) and, in the embodiments shown in FIG. 1, has its own drive M which is regulated if desired by means of the regulator (10).

In another embodiment, the template (17) itself may form the outlet opening (15) at the end of the stabilising zone (14) and thus constitutes an extension of the latter; the template (17) may also be rotatably mounted, its drive again being regulated by the regulator (10) and being synchronous with the number of strokes.

We claim:

1. Apparatus for the controlled release of powdered material in fixed cycles and in metered individual amounts onto objects which are traveling past for the purpose of applying lubricant or separating compounds to the stressed surfaces of pressing tools in tablet making machines or for applying finely divided solids to solid carrier materials in the pharmaceutical, food or catalyst fields which comprises a means for metering quantifies of powdered material with selectable throughput, an homogenization chamber for homogenizing said metered quantities of powdered material, at least one venturi nozzle positioned downstream of said homogenization chamber, a means for supplying pulses of a gaseous transporting medium to said venturi nozzle, an electronically, mechanically or pneumatically actuated valve means for controlling the pulsed supply of said gaseous transporting medium to said venturi nozzle in synchronism with the timing of the objects traveling past whereby said homogenized powdered material is drawn into said gaseous transporting medium to produce pulses of powdered material, and a directing means for directing said pulses of powdered material toward the objects traveling past.

2. Apparatus as claimed in claim 1, wherein each said venturi nozzle comprises one or more air nozzles, one or more mixing chambers and one or more mixing nozzles, and has at its entry end a rotary slide valve which is secured to a spindle and which can be actuated so that the spindle operates synchronously as a function of the number of nozzle openings in the rotary slide valve at a required frequency, further comprising a stabilization tube fitting flush against the mixing nozzle or nozzles and from which the metered material emerges at one end thereof through a slot-shaped outlet opening, wherein said directing means is located on the spindle, or on an extension of the spindle, or fixedly at the end of the stabilizing tube, said directing means deflecting the metered material at right angles, a template being mounted adjacent the outlet opening of said stabilization tube for defining the shape of said pulses of powdered material.

3. Apparatus as claimed in claim 1, wherein the outlet opening of the venturi nozzle is in form of a diaphragm piston which is axially movable back and forth at regular intervals of time in order to prevent harmful accumulations of the material being transported.

4. Apparatus as claimed in claim 2, wherein brush or wiper elements are mounted on the spindle in the region of the venturi nozzle, offset relative to the nozzle openings in the rotary slide valve, and are similarly mounted in the region of the stabilization tube.

5. Apparatus as claimed in claim 1, wherein the homogenization chamber is filled with the powdered material using means selected from the group consisting of a) a metering roller with groove and wiper, b) a single- or double-shaft metering screw, c) a conveyor belt, and d) a spreader with a screen as the metering means, the metering means being operated in synchronism with the valve means.

6. Apparatus as claimed in claim 5, wherein the homogenization chamber comprises means for homogenizing said powdered material selected from the group consisting of a fluidized bed chamber, a stirrer and a suitable guiding of air.

7. Apparatus as claimed in claim 6, wherein the homogenization chamber filling means is a spreader and a screen, and the screen, on the side nearest the homogenization chamber, has a resiliently mounted spreader which touches the screen in a selected manner and is coupled to and driven by the rotary slide valve spindle.

* * * * *